United States Patent
Beardsmore et al.

(10) Patent No.: US 10,043,223 B2
(45) Date of Patent: Aug. 7, 2018

(54) MANAGING POWER DISTRIBUTION

(75) Inventors: Anthony P. Beardsmore, Winchester (GB); Oliver Fenton, Watford (GB); Jonathan Levell, Winchester (GB)

(73) Assignee: International Business Machines Corporation, Armonk, NY (US)

(*) Notice: Subject to any disclaimer, the term of this patent is extended or adjusted under 35 U.S.C. 154(b) by 2125 days.

(21) Appl. No.: 12/982,799

(22) Filed: Dec. 30, 2010

(65) Prior Publication Data

US 2012/0173418 A1 Jul. 5, 2012

(51) Int. Cl.
| | |
|---|---|
| G06Q 40/00 | (2012.01) |
| G06F 1/26 | (2006.01) |
| G01R 21/00 | (2006.01) |
| G06Q 50/06 | (2012.01) |
| G06Q 30/06 | (2012.01) |
| G07F 15/00 | (2006.01) |

(52) U.S. Cl.
CPC ............ *G06Q 50/06* (2013.01); *G06Q 30/06* (2013.01); *G07F 15/006* (2013.01); *Y04S 50/10* (2013.01)

(58) Field of Classification Search
CPC .......... G06Q 30/04; G06Q 40/00; G06F 1/26; Y04S 5/12; H02J 7/0027
USPC ..................................................... 705/35–45
See application file for complete search history.

(56) References Cited

U.S. PATENT DOCUMENTS

| | | | | |
|---|---|---|---|---|
| 2002/0133457 A1* | 9/2002 | Gerlach et al. | ................ | 705/39 |
| 2009/0156268 A1* | 6/2009 | Kim et al. | ................... | 455/573 |
| 2010/0174629 A1* | 7/2010 | Taylor et al. | .................. | 705/34 |
| 2010/0217449 A1 | 8/2010 | Musti et al. | | |
| 2010/0256831 A1* | 10/2010 | Abramo et al. | .............. | 700/292 |
| 2011/0004549 A1* | 1/2011 | Gray et al. | ...................... | 705/40 |

* cited by examiner

*Primary Examiner* — Scott S Trotter
(74) *Attorney, Agent, or Firm* — Steven M. Greenberg, Esq.; CRGO Law

(57) ABSTRACT

In an embodiment of the invention, a method for wireless power generation for managing power distribution in a wireless environment is provided. The method includes receiving a request from a device to connect to a wireless power distribution base station, authenticating the device, determining a lease period during which time power is to be delivered wirelessly to the device in response to authenticating the device, and delivering power wirelessly from the wireless power distribution base station to the device for the duration of the lease period, but subsequent to the lease period, discontinuing delivery of power wirelessly to the device.

19 Claims, 3 Drawing Sheets

MANAGING POWER DISTRIBUTION

BACKGROUND OF THE INVENTION

Field of the Invention

The present invention relates to the field of wireless power generation and more particularly to managing power distribution in a wireless environment.

Description of the Related Art

Modern society is dependent on power and, thus, on electricity. One no longer burns a candle for the illumination required to read a book at night, but instead one expects to have light to read by when flipping on a light switch. Almost every device of daily life requires power—a coffee pot, an alarm clock, a television. To access the power required to use the device, one generally connects the device to a power outlet using a cord. Oftentimes, however, there are more devices requiring power outlets then there are accessible power outlets. In consequence, in many cases one must choose between devices to power with an available power outlet and devices to remain unpowered. The problem of limited power outlets can be compounded in a public environment, where there are often no power outlets available to the public. Power splitters provide additional power outlets by augmenting a single power outlet into two or more power outlets, but power cords of different devices easily can become tangled. In addition, overloading power splitters causes electrical fires and is not permitted by the fire code of many municipalities.

More recently, devices, such as portable computers (laptops) and mobile telephones, no longer require a power cord be plugged in to a wall outlet to function, but still require power to work. These devices often function from battery power, but if the battery power becomes fully drained the device no longer can function and will shut down. Depending on what device is in use, the loss of power can cause one to lose important data or documents. Once a battery becomes low in charge or completely drained, the battery can be recharged, but one still must use a power cord attached to the device and connected to a wall outlet to charge the battery; thus, one still must carry the power cord and have access to a power outlet.

To address the difficulties of tethering a device to a power outlet in order to derive power for the device, wireless power distribution networks have been deployed in selective environments. Wireless energy transfer or wireless power distribution refers to the transmission of electrical energy from a power source to an electrical load without interconnecting wires. Wireless power differs from wireless telecommunications, where the signal-to-noise ratio (SNR) or the percentage of energy received becomes critical only if it is too low for the signal to be adequately recovered. With wireless power transmission, efficiency is the more important parameter. The most common form of wireless power transmission is carried out using inductive coupling followed by resonant inductive coupling. Other methods include microwaves and lasers.

Electromagnetic induction wireless transmission techniques are near field over distances comparable to a few times the diameter of the device or devices approaching one quarter of the wavelength used. Near field energy itself is non-radiative but some radiative losses do occur. In addition there are usually resistive losses. Energy transfer by induction is usually magnetic but capacitive coupling can also be achieved. Electromagnetic induction find recent application to the wireless inductive charging of batteries. Inductive charging uses the electromagnetic field to transfer energy between two objects. Specifically, a charging station sends energy through inductive coupling to an electrical device, which stores the energy in the batteries.

BRIEF SUMMARY OF THE INVENTION

Embodiments of the present invention address deficiencies of the art in respect to wireless power generation and provide a novel and non-obvious method, system and computer program product for managing power distribution in a wireless environment. In an embodiment of the invention, a method for managing power distribution in a wireless environment is provided and includes receiving a request from a device to connect to a wireless power distribution base station, authenticating the device, determining a least period during which time power is to be delivered wirelessly to the device in response to authenticating the device, and delivering power wirelessly from the wireless power distribution base station to the device for the duration of the lease period, but subsequent to the lease period, discontinuing delivery of power wirelessly to the device.

Another embodiment of the invention provides a power distribution system for wireless power management distribution. The system can include a wireless power distribution base configured to support a database and a power management distribution module. The power management distribution module can include program code for receiving a request from a device to connect to a wireless power distribution base station, authenticating the device, determining a lease period during which time power is to be delivered wirelessly to the device in response to authenticating the device, and delivering power wirelessly from the wireless power distribution base station to the device for the duration of the lease period, but subsequent to the lease period, discontinuing delivery of power wirelessly to the device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In accordance with an embodiment of the invention, a request to connect to a wireless power distribution base station can be received from a device. In the course of processing the request to connect to the wireless power distribution base station, the device can be authenticated to ensure that it is authorized to access the base station and optionally, a billing record can be generated for the device, or a payment processed for the device. Once authenticated, the device can activate the base station or a "power hotspot" associated with the base station, so that power from the base station can be delivered to the device. Of note, the device may only maintain access to the wireless power distribution of the base station for a pre-determined, finite period of time. Once this "lease period" of time has lapsed, access to the base station can terminate. In this way, the device can charge its operating battery without the need to plug a power cord into a power outlet, but access to receiving a charge can be moderated according to a pre-authorization to charge the device, or a payment received in exchange for the limited period of time during which the device can charge.

Figure 1:
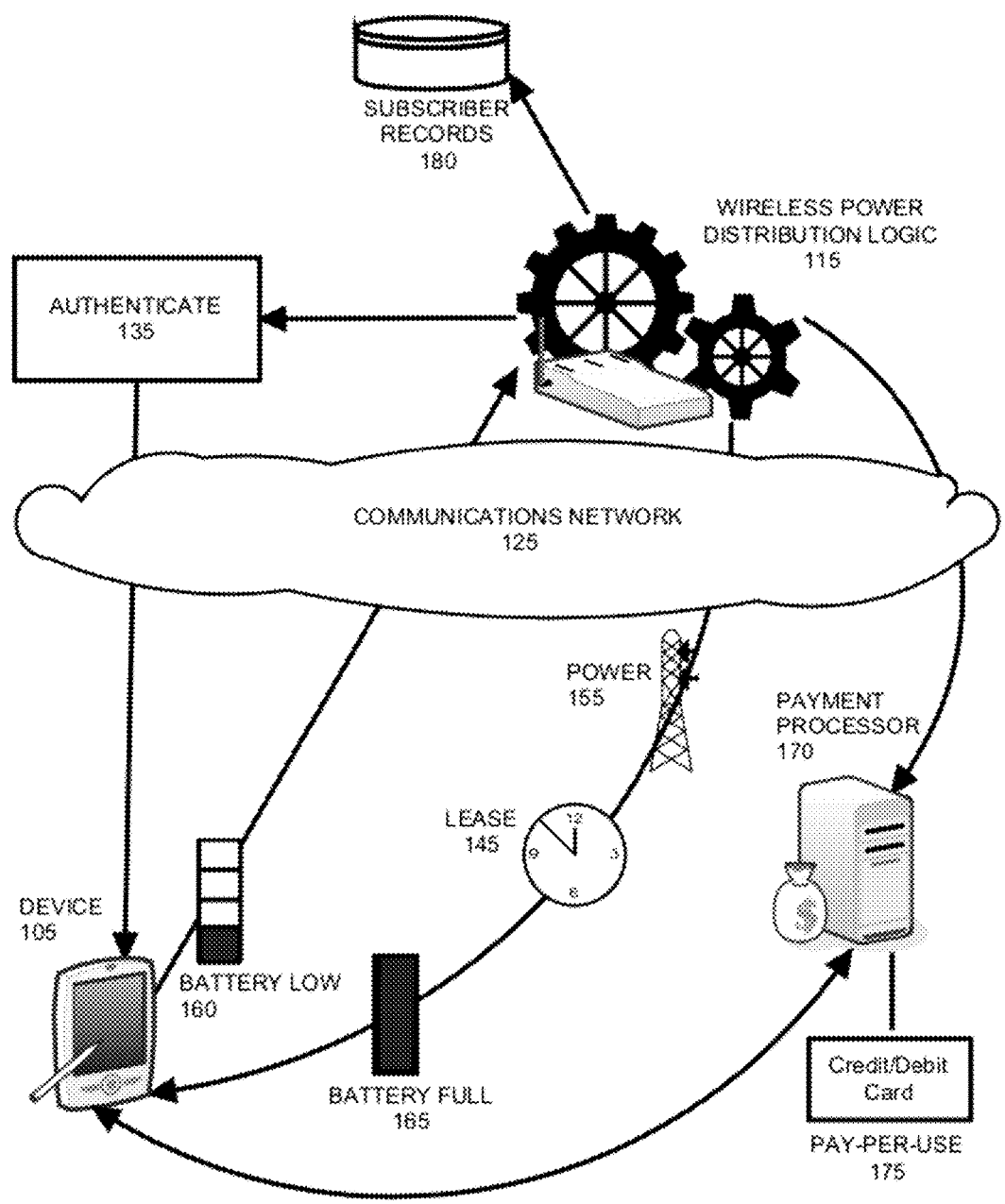
FIG. 1 is a pictorial illustration of a process for managing wireless power distribution.

In further illustration, FIG. 1 pictorially shows a process for managing wireless power distribution. As shown in FIG. 1, a user by way of a computing device 105 with a partially or full depleted battery charge 160 requests access to a wireless power distribution base station 155 via a communications network 125. Upon receiving the request to access the wireless power distribution base station 155, wireless power distribution logic 115 authenticates 135 the device 105 or a user of the device 105. Wireless power distribution logic 115 may authenticate 135 the device 105 or user of the device 105 by identifying a user associated with the device 105, locating a subscription record for the user in a database containing subscriber records 180, verifying the validity of the subscription, and recording an access event in the subscription record.

Upon successful authentication, wireless power distribution logic 115 determines a lease period 145 during which time power is to be delivered to the device 105 from the wireless power distribution base station 155. Wireless power distribution logic 115 may determine the lease period 155 by retrieving the lease period 145 in the record of the subscriber for the device 105. Optionally, upon determining the lease period 145, the wireless power distribution logic 115 sends a payment processor 170 information to charge the user for the prospective lease or to verify a subscription exists for the prospective lease. The information sent to the payment processor 170 by the wireless power distribution logic 115 is not limited, but can include a user identity associated with the device 105, a number or an alpha-numeric number that identifies the device, such as a media access control (MAC) address, hardware address, or physical address, payment information, lease period 145, and device 105 information.

The role of the payment processor 170 is not so limited as to the exemplary embodiment described herein. For instance, as another option, the payment processor 170 may calculate a fee for delivering power wirelessly from the wireless power distribution base station to the device 105, display the fee to the device 105, and receive authorization of payment of the fee from the device 105. In any event, upon determining the lease period 145, wireless power distribution logic 115 delivers power from the wireless power distribution base station 155 to the device 105 for the duration of the lease period 145, but subsequent to the lapsing of the lease period 145, discontinuing delivery of power to the device 105. Optionally, wireless power distribution logic 115 may discontinue delivering power to the device 105 before the expiration of the lease period 145 if the battery of the device enjoys a full charge 165 or if the device 105 disconnects from the wireless power distribution base station 155.

Figure 2:
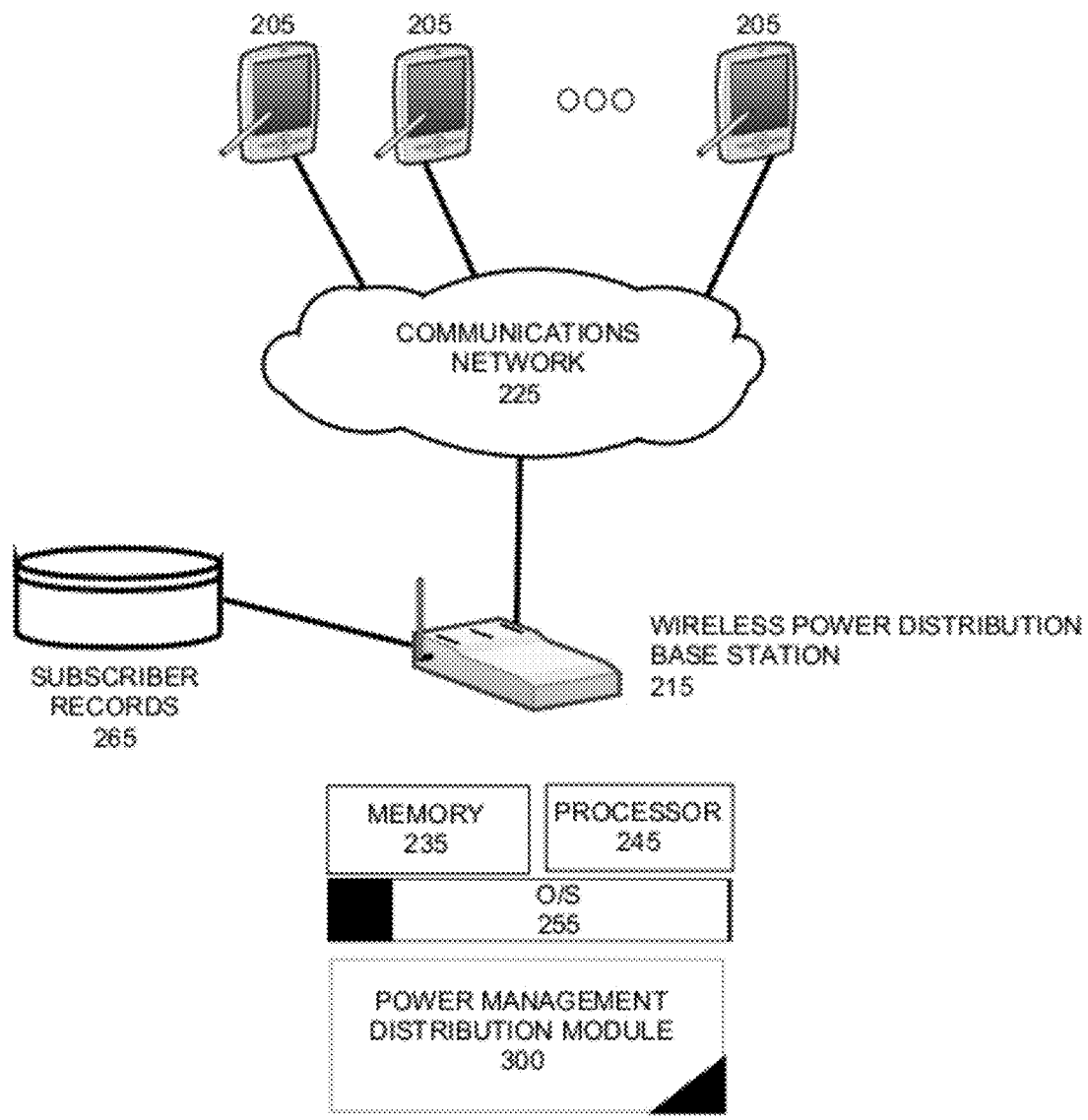
FIG. 2 is a schematic illustration of a power distribution management system configured for managing wireless power distribution; and, FIG. 3 is a flow chart illustrating a process for managing wireless power distribution.

The process described in connection with FIG. 1 can be implemented in a power distribution management system. In further illustration, FIG. 2 is schematically shows a power distribution management system configured for managing wireless power distribution. The system can include a wireless power distribution base station 215. The wireless power distribution base station 215 can include one processor 245 and memory 235 supporting the execution of an operating system (O/S) 255. The O/S 255 in turn can host the operation of a database containing subscriber records 265 and a power management distribution module 300 over a communications network 225 such as the Internet, and managing access thereto by different computing devices 205.

The power management distribution module 300 can execute in the memory 235 of the wireless power distribution base station 215. The power management distribution module 300 can include program code, which when executed by at least one processor 245 on the wireless power distribution base station 215, responds to a request from a device 205 over a communications network 225 to connect to a wireless power distribution base station 215 by authenticating the device 205. The program code for the wireless management distribution module 300 may be enabled so that authentication of the device 205 can include identifying a user associated with the device 205, for example over a wireless network connection like an 802.11x ad hoc or peer-to-peer connection, or any other short range wireless communications technique. Once the user has been identified, a subscription record can be located for the user in a database containing subscriber records 265, verifying the validity of the subscription, and recording an access event to the wireless power base station 215 for the user.

Optionally, in recognition that a low battery condition in the device 205 would otherwise inhibit authentication of the device 205, during authentication, the wireless power distribution base station 215 can deliver power temporarily to allow the process of authentication to proceed. Further, during authentication, the power management distribution module 300 can estimate an amount of power to be consumed by the device 205 during a lease period and can confirm that payment can be made by an associated user to account for the consumption by the device 205 of the estimated amount of power. The information available subscriber records 265 is not limited, but can include user identification, device identification, payment information, including credit card information, lease payment information, and correlating information associating a device's identity to its user or owner.

Once the device 205 has been authenticated, the program code can be further enabled to determine a lease period during which time power is to be delivered wirelessly to the device 205. Upon the determination of a lease period, the program code can even yet further deliver power wirelessly from the wireless power distribution base station 215 to the device 205 for the duration of the lease period, but subsequent to the lease period, discontinuing delivery of power wirelessly to the device 205. Optionally, the program code for the power management distribution module 300 may be enabled to send information to a payment processor to charge a customer for the lease, to verify that a subscription exists for the lease, or to charge a customer on a pay-per-use.

Figure 3:
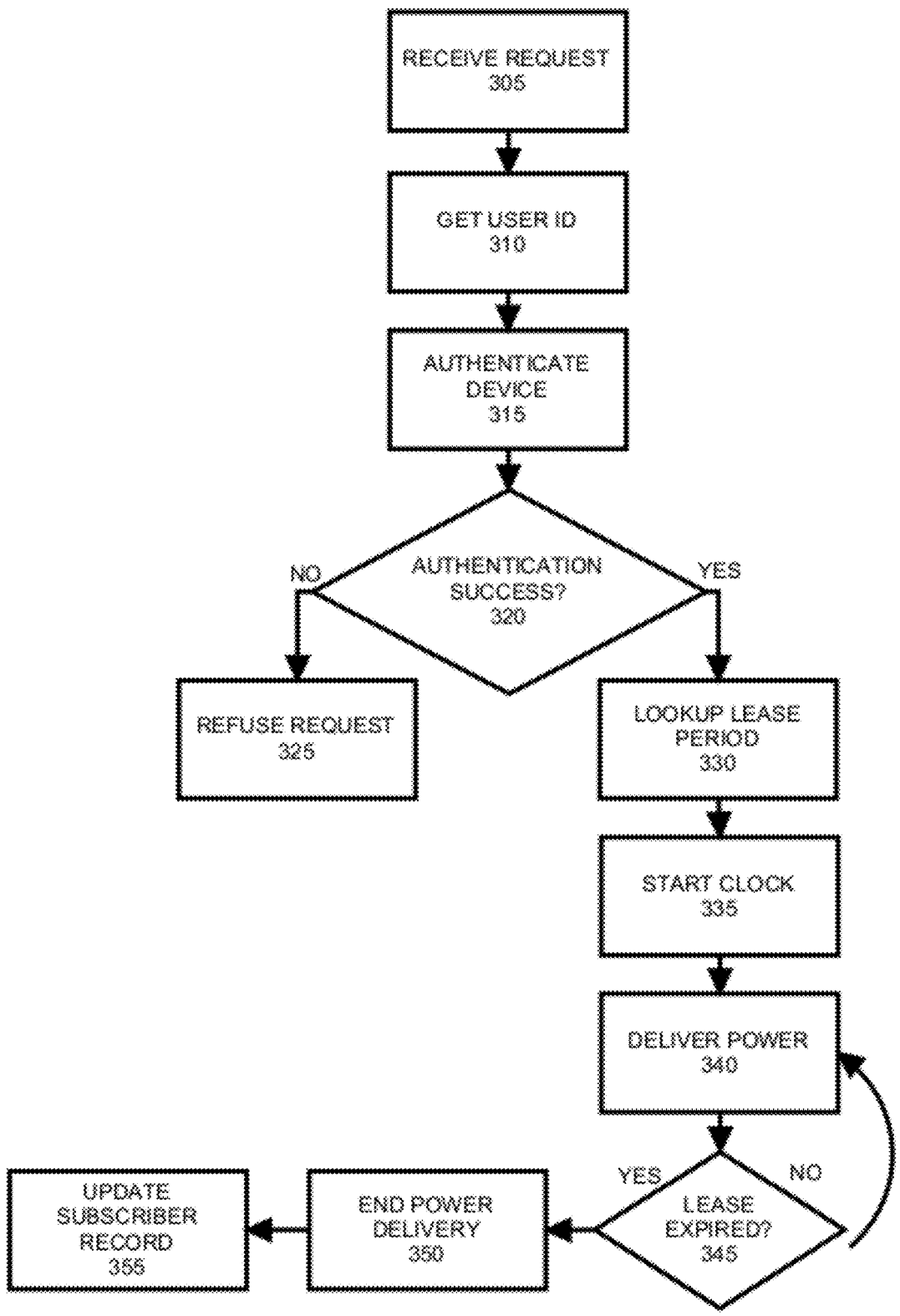

In even yet further illustration of the operation of the program code of the power management distribution module 300, FIG. 3 is a flow chart illustration a process for managing wireless power distribution. Beginning in block 305, a request over the communications network can be received from a device to connect to a wireless power distribution base station. In block 310, the user identity (ID) associated with the device can be determined and the device can be authenticated, as shown in block 315.

In block 320, a determination of whether or not authentication is successful can be made. The method for authentication is not limited, but can include using the user's identity or the device's identity to locate a subscription record in a database of subscriber records for the user or the user's device and verifying validity of the subscription. Optionally, an access event can be recorded in the subscriber's record. In block 325, if authentication is unsuccessful, the request to connect can be refused. In block 330, if authentication is successful, the lease period can be determined. The method for determining the lease period is not limited, but the lease period can be determined by performing a lookup in a database containing subscriber records.

In block 335, upon a determination of the least period, a timer (or a clock) can be started. Upon the start of the timer, power can be delivered to the device, as indicated in block 340. In block 345, whether or not the expiration of the lease period can be determined. Upon a determination that the lease period has not yet expired, power can continue to be delivered. Once the lease period has expired, power delivery is terminated, as indicated in block 350. In block 355, upon the end of power delivery, the subscriber's record can be updated to reflect power usage. The subscriber's record is not limited to what information it can contain, but can include total power usage, the time use began, the time use ended, and the total time power accessed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Further, with specific reference to a computer readable storage medium, it is to be understood that a readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing power distribution by a wireless power distribution base station, comprising:
  receiving a request from a device to connect to a wireless power distribution base station;
  determining whether a low battery condition exists for the device and also delivering power wirelessly for a limited duration to the device upon determining that the low battery condition exists for the device until the device is authenticated;
  authenticating the device;
  determining a lease period during which time power is to be delivered wirelessly to the device in response to authenticating the device;
  delivering power wirelessly from the wireless power distribution base station to the device for the duration of the lease period, but subsequent to the lease period, discontinuing delivery of power wirelessly to the device, wherein delivering power to the device is discontinued before expiration of the lease period upon determining one of a battery of the device reaches a full charge and the device disconnects from the wireless power distribution base station.

2. The method of claim 1, further comprising
  calculating a fee for delivering power wirelessly from the wireless power distribution base station to the device for the duration of the lease period;
  displaying the fee to the device; and,
  receiving authorization of payment of the fee from the device.

3. The method of claim 1, wherein authenticating the device comprises:
  identifying a user associated with the device;
  locating a subscription record for the user; and,
  verifying validity of the subscription.

4. The method of claim 1, wherein authenticating the device comprises:
  terminating delivering power for the limited duration to the device upon determining that the device fails to authenticate.

5. The method of claim 1, wherein authenticating the device comprises:
  determining an amount of power expected to be drawn by the device;
  identifying a user associated with the device;
  locating a subscription record for the user; and,
  verifying an availability of payment by the user for an amount commensurate with the expected amount of power.

6. The method of claim 1, wherein the lease period is determined by performing a lookup in a database containing subscriber records.

7. A computer program product for wireless power management distribution the computer program product, comprising:
  a computer readable storage medium having computer readable program code embodied therewith, the computer readable program code comprising:
  computer readable program code for receiving a request from a device to connect to a wireless power distribution base station;
  computer readable program code for determining whether a low battery condition exists for the device and also delivering power wirelessly for a limited duration to the device upon determining that the low battery condition exists for the device until the device is authenticated;
  computer readable program code for authenticating the device;
  computer readable program code for determining a lease period during which time power is to be delivered wirelessly to the device in response to authenticating the device; and,
  computer readable program code for delivering power wirelessly from the base station to the device for the duration of the lease period, but subsequent to the lease period, discontinuing delivery of power wirelessly to the device;
  wherein delivering power to the device is discontinued before expiration of the lease period upon determining one of a battery of the device reaches a full charge and the device disconnects from the wireless power distribution base station.

8. The computer program product of claim 7, further comprising:
computer readable program code for calculating a fee for delivering power wirelessly from the wireless power distribution base station to the device for the duration of the lease period;
computer readable program code for computer readable program code for displaying the fee to the device; and,
computer readable program code for receiving authorization of payment of the fee from the device.

9. The computer program product of claim 7, wherein the computer readable program code for authenticating the device comprises:
computer readable program code for identifying a user associated with the device
computer readable program code for locating a subscription record for the user; and,
computer readable program code for verifying validity of the subscription.

10. The computer program product of claim 7, wherein authenticating the device comprises:
computer readable program code for terminating delivering power for the limited duration to the device upon determining that the device fails to authenticate.

11. The computer program product of claim 7, wherein authenticating the device comprises:
computer readable program code for determining an amount of power expected to be drawn by the device;
computer readable program code for identifying a user associated with the device;
computer readable program code for locating a subscription record for the user; and,
computer readable program code for verifying an availability of payment by the user for an amount commensurate with the expected amount of power.

12. The computer program product of claim 7, wherein the lease period is determined by performing a lookup in a database containing subscriber records.

13. A power distribution system configured for wireless power management distribution, comprising:
a wireless power distribution base with at least one processor and memory;
a database coupled to the wireless power distribution base;
an operating system executing on the wireless power distribution base; and,
a power management distribution module coupled to the operating system, the module comprising program code enabled to receive a request from a device to connect to a wireless power distribution base station, to determine whether a low battery condition exists for the device and also delivering power wirelessly for a limited duration to the device upon determining that the low battery condition exists for the device until the device is authenticated, to authenticate the device, to determine a lease period during which time power is to be delivered wirelessly to the device in response to authenticating the device, and to delivery power wirelessly from the base station to the device for the duration of the lease period, but subsequent to the lease period, discontinuing delivery of power wirelessly to the device, wherein delivering power to the device is discontinued before expiration of the lease period upon determining one of a battery of the device reaches a full charge and the device disconnects from the wireless power distribution base station.

14. The system of claim 13, further comprises a payment processor.

15. The system of claim 13, wherein the power management distribution module further comprises program code enabled to calculate a fee for delivering power wireless from the wireless power distribution base station to the device for the duration of the lease period, to display the fee to the device, and to receive authorization of payment of the fee from the device.

16. The system of claim 13, wherein the power management distribution module comprising program code enabled to authenticate the device, comprises program code enabled to identify a user associate with the device, and to locate a subscription record for the user, to verify validity of the subscription.

17. The system of claim 16, further comprises program code enabled to record an access even to the wireless power distribution base station for the user.

18. The system of claim 13, wherein the lease period is determined by performing a lookup in a database containing subscriber records.

19. The system of claim 13, wherein the program code enabled to authenticate the device comprises program code to terminate delivering power for the limited duration to the device upon determining that the device fails to authenticate.

* * * * *